(12) United States Patent
Riall et al.

(10) Patent No.: US 9,329,410 B2
(45) Date of Patent: May 3, 2016

(54) OPHTHALMIC LENSES WITH COLORANT PATTERNED INSERTS

(71) Applicant: Johnson & Johnson Vision Care, Inc.

(72) Inventors: James Daniel Riall, Saint Johns, FL (US); Frederick A. Flitsch, New Windsor, NY (US); Randall B. Pugh, Jacksonville, FL (US); Sharika Snook, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 117 days.

(21) Appl. No.: 13/841,186

(22) Filed: Mar. 15, 2013

(65) Prior Publication Data

US 2014/0268015 A1  Sep. 18, 2014

(51) Int. Cl.
G02C 7/02 (2006.01)
G02C 7/10 (2006.01)
G02C 7/04 (2006.01)
G02C 11/00 (2006.01)

(52) U.S. Cl.
CPC .............. *G02C 11/10* (2013.01); *G02C 7/021* (2013.01); *G02C 7/046* (2013.01); *G02C 7/101* (2013.01); *G02C 2202/16* (2013.01)

(58) Field of Classification Search
CPC .......... G02C 7/021; G02C 7/04; G02C 7/046; G02C 11/10; G02C 2202/16; G02C 7/101
USPC .................. 351/158, 159.03, 159.24–159.34, 351/159.39, 159.62, 159.66
See application file for complete search history.

(56) References Cited

U.S. PATENT DOCUMENTS

| 5,712,721 | A * | 1/1998 | Large .......................... 359/245 |
| 7,591,557 | B2 * | 9/2009 | Plummer ................. 351/159.73 |
| 7,931,832 | B2 * | 4/2011 | Pugh et al. .................. 264/1.32 |
| 2005/0001978 | A1 * | 1/2005 | Ocampo ....................... 351/162 |
| 2009/0033863 | A1 * | 2/2009 | Blum et al. .............. 351/160 R |
| 2010/0078838 | A1 | 4/2010 | Pugh et al. |
| 2010/0110372 | A1 * | 5/2010 | Pugh et al. .................. 351/177 |
| 2011/0279905 | A1 | 11/2011 | Pugh et al. |
| 2012/0162600 | A1 | 6/2012 | Pugh |
| 2012/0218508 | A1 | 8/2012 | Pugh et al. |
| 2012/0236524 | A1 | 9/2012 | Pugh et al. |

FOREIGN PATENT DOCUMENTS

DE  102006005652 A1  9/2007

OTHER PUBLICATIONS

EP Search Report EP EP 14 15 9984Dated Jun. 27, 2014.
Written Opinion Singapore Application No. I020I4004I8U Actual completion of the search: Office of Singapore: Dec. 17, 2014 Sep. 24, 2014; Date ISOS notified Agent: Mar. 10, 2015 Date of Agent notified Johnson & Johnson Apr. 7, 2015.

* cited by examiner

*Primary Examiner* — Darryl J Collins

(57) ABSTRACT

This invention discloses methods and apparatus for patterning Multi-piece ophthalmic Insert and Ophthalmic lenses comprising Inserts. In some embodiments, an ophthalmic lens is cast molded from a silicone hydrogel and the lens includes a sealed and encapsulated Multi-piece ophthalmic Insert portion which has been patterned.

23 Claims, 6 Drawing Sheets

OPHTHALMIC LENSES WITH COLORANT PATTERNED INSERTS

FIELD OF USE

This invention describes apparatus and devices with printed colorant patterns on ophthalmic lens device inserts. More specifically, this invention describes various aspects of ophthalmic lens inserts with printed patterns s in the fabrication of an ophthalmic lens device with a Multi-piece Insert.

BACKGROUND

Traditionally, an ophthalmic device, such as a contact lens, an intraocular lens, or a punctal plug included a biocompatible device with a corrective, cosmetic, or therapeutic quality. A contact lens, for example, can provide one or more of: vision correcting functionality; cosmetic enhancement; and therapeutic effects. Each function is provided by a physical characteristic of the lens. A design incorporating a refractive quality into a lens can provide a vision corrective function. A pigment incorporated into the lens can provide a cosmetic enhancement. An active agent incorporated into a lens can provide a therapeutic functionality. Such physical characteristics may be accomplished without the lens entering into an energized state.

More recently, it has been theorized that active components may be incorporated into a contact lens. Some components can include semiconductor devices. Some examples have shown semiconductor devices embedded in a contact lens placed upon animal eyes. However, such devices lack a free standing energizing mechanism. Although wires may be run from a lens to a battery to power such semiconductor devices, and it has been theorized that the devices may be wirelessly powered, no mechanism for such wireless power has been available.

The resulting products of ophthalmic lenses containing inserts and components may produce a device that has a visual projection when worn that displays components and interconnects and various other features, which appear different from a standard look of a user's eye. It may be desirable for some users that the end ophthalmic product have printed features upon it that render an appearance that is similar to a standard look of a user's eye. Accordingly novel methods, devices, and apparatus relating to the patterning of various components in ophthalmic and biomedical devices formed with inserts are therefore important.

SUMMARY

The present invention includes innovations relating to the patterning of various components including for example inserts that can be incorporated into an ophthalmic device. Examples of such ophthalmic devices may include, for example a contact lens or a punctal plug. From a more general perspective, numerous other biomedical devices may be relevant within the scope of the invention. In addition, methods and apparatus for forming an ophthalmic lens, with a sealed or encapsulated patterned Multi-piece Insert are presented. In some embodiments, the insert is in an energized state capable of powering a component capable of drawing a current. Non-limiting examples of Components may include one or more of a variable optic lens element, a semiconductor device, and an active or passive electronic device. These components may also include the ability of being activated by an external signal of various types. Some embodiments can also include a cast molded silicone hydrogel contact lens with a rigid or formable energized insert contained within the ophthalmic lens in a biocompatible fashion where the patterning either occurs on surfaces of the insert or at or near the surface of the ophthalmic device itself.

In some embodiments, a multi-piece insert device for an ophthalmic lens is disclosed. In some embodiments, this method includes one or both of a first insert back curve piece; at least a first insert front curve piece proximate to the first insert back curve piece; a conductive material upon one or both of the first insert front curve piece and first insert back curve piece; an electronic Component attached to one or both of the first insert front curve piece and first insert back curve piece, wherein an attachment is made at least in part to the conductive material and; a first colorant pattern upon a surface of one or both of the first insert front and first insert back curve pieces.

In some embodiments, the multi-piece insert device includes at least a second insert back curve piece in contact with the first back curve piece. In some embodiments, the first colorant pattern is a limbal ring pattern. In some embodiments, the first colorant pattern is an iris pattern. In some other embodiments, the first colorant pattern is a camouflage pattern that obstructs the observance of components within the insert by changing the appearance of them.

In some other embodiments, within the first colorant pattern is a first region where the patterning allows visible light to pass through the insert surface. In some other embodiments, between the insert front curve piece and the insert back curve piece and behind the first region where the patterning allows visible light to pass is located a light detector. In some other embodiments, within the first colorant pattern is a second region that comprises a colorant that is opaque to visible light.

In some embodiments, between the insert front curve piece and the insert back curve piece and behind the second region in the first colorant pattern is at least a portion of an integrated circuit device. In some embodiments, the limbal ring pattern comprises black colorant.

In some embodiments, an ophthalmic lens device is disclosed. In some embodiments, the device includes at least a first insert back curve piece; at least a first insert front curve piece; a conductive material upon one or both of the first insert front curve piece and first insert back curve piece; an electronic component attached to one or both of the first insert front curve piece and first insert back curve piece, wherein an attachment is made at least in part to the conductive material; an encapsulating layer, wherein the insert encapsulating layer is a hydrogel; and a first colorant pattern upon a surface of the encapsulating layer.

In some embodiments, the device additionally includes at least a second insert back curve piece. In some other embodiments, the first colorant pattern is a limbal ring pattern. In some other embodiments, the first colorant pattern is an iris pattern. In some other embodiments, the first colorant pattern is a camouflage pattern that obstructs the observance of components within the insert by changing the appearance of them. In some other embodiments, within the first colorant pattern is a first region where the patterning allows visible light to pass through the insert front curve surface.

In some embodiments, a light detector is located between the insert front curve piece and the insert back curve piece and behind the first region where the patterning allows visible light to pass. In some other embodiments, within the first colorant pattern is a second region that includes a colorant that is opaque to visible light. In some other embodiments, between the insert front curve piece and the insert back curve piece and behind the second region in the first colorant pattern is at least a portion of an integrated circuit device. In some embodiments, the device additionally includes a liquid meniscus lens element. In some embodiments, the device additionally includes a coating over the insert and pattern, wherein the coating comprises a more consistent adhesion property than the insert and pattern without the coating. In some embodiments, the coating comprises paralene.

DETAILED DESCRIPTION OF THE INVENTION

Figure 1:
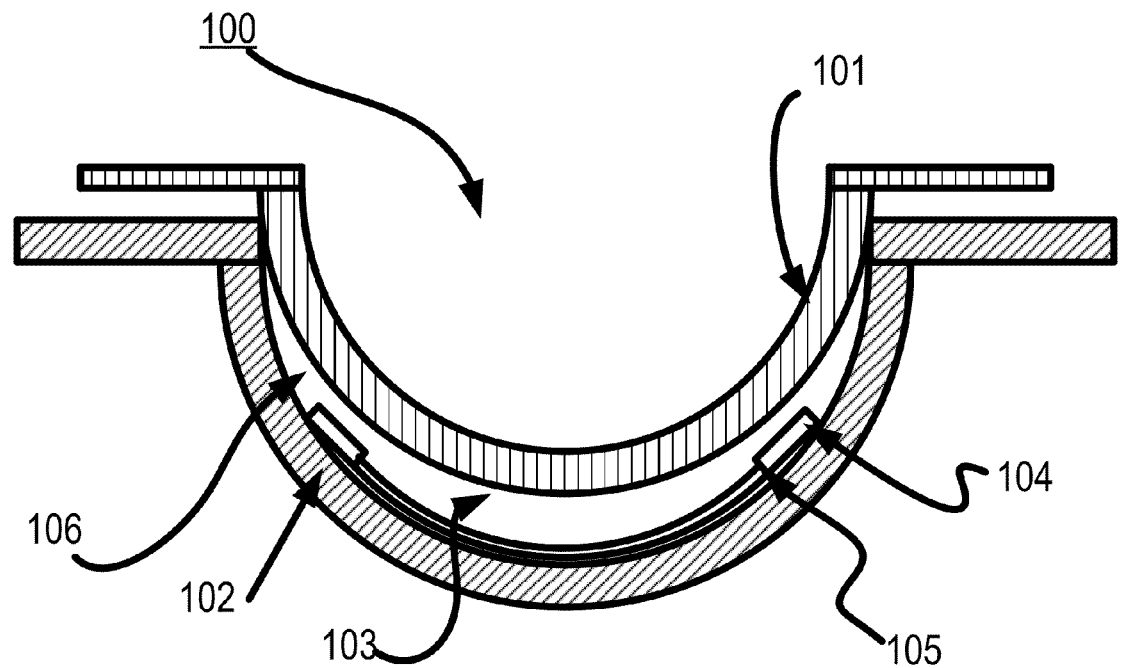
FIG. 1 illustrates a mold assembly apparatus according to some embodiments of the present invention.

The present invention includes methods and apparatus for manufacturing an Ophthalmic Lens with a Multi-piece Insert where portions of the Insert or an Ophthalmic Lens formed from an Insert may include aspects of patterning. In addition, the present invention includes an Ophthalmic Lens with a Multi-piece Insert incorporated into the Ophthalmic Lens including the aspects of patterning.

According to the present invention, an Ophthalmic Lens device is formed with an embedded Insert that in some cases includes an Energy Source, such as an electrochemical cell or battery as the storage means for the energy. In some embodiments, a formed Ophthalmic Lens may be patterned in numerous ways including, but not limiting to, printing of patterns upon a fully formed Ophthalmic Lens device, upon a partially formed ophthalmic device, or upon surface portions of an Insert that is subsequently formed into an Ophthalmic Lens device.

In some embodiments, a Multi-piece Insert also includes a pattern of circuitry, components, and Energy Sources. Various embodiments can include the Multi-piece Insert locating the pattern of circuitry, components, and Energy Sources around a periphery of an optic zone through which a wearer of a lens would see. In some embodiments, the Multi-piece Insert may include a pattern of circuitry, Components and Energy Sources, which are potentially small enough to not adversely affect the sight of a contact lens wearer. In some embodiments, the Components and the Energy Source are located within, or exterior to, an optical zone. In some embodiments, the patterned formed by these various components within, attached to, or upon the Insert may create a need for a pattern to be placed in such a manner to conceal or obstruct the pattern formed by the components.

In some embodiments of the present invention, a Multi-piece Insert is embodied within an Ophthalmic Lens via automation that places an Energy Source in a desired location relative to a mold part used to fashion the lens. The embodiments that place the various Components into the Ophthalmic Lens may employ one or more steps where Components are sealed and adhered into place or Components are encapsulated.

In some embodiments, an Energy Source is placed in electrical communication with a Component that can be activated on command and draws electrical current from the Energy Source included within the Ophthalmic Lens. In some embodiments, a component can include, but is not limited to, a semiconductor device, an active or passive electrical device, or an electrically activated machine. In some embodiments, an electrically activated machine may include, but is not limited to, Microelectromechanical systems (MEMS), nano-electromechanical systems (NEMS), or micromachines. In some embodiments, subsequent to placing the Energy Source and component, a Reactive Mixture can be shaped by the mold part and polymerized to form the Ophthalmic Lens.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Back Curve Piece: as used herein (and sometimes as an Insert back curve) refers to a solid element of a Multi-piece Insert which when assembled into the said Insert will occupy a location on the side of the lens that is on the back. In an ophthalmic device, such a piece would be located on the side of the Insert that would be closer to the user's eye surface. In some embodiments, the back curve piece may contain and include a region in the center of an ophthalmic device through which light may proceed into the user's eye or an optic zone. In some embodiments, the piece may take an annular shape where it does not contain or include some or all of the regions in an optic zone. In some embodiments, there may be multiple back curve pieces of an Insert where one of the Inserts may include the optic zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and prevent specified substances, such as, for example, water, from entering the entity.

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Front Curve Piece: as used herein (and sometimes as an Insert front curve) refers to a solid element of a Multi-piece Insert which when assembled into the said Insert will occupy a location on the side of the lens that is on the front. In an ophthalmic device, such a piece would be located on the side of the Insert that would be further from the user's eye surface. In some embodiments, the piece may contain and include a region in the center of an ophthalmic device through which light may proceed into the user's eye or an optic zone. In other embodiments, the piece may be annular in shape where it does not contain or include some or all of the regions in an optic zone. In some embodiments, an ophthalmic Insert, may include multiple front curve pieces where one of the pieces may include the optic zone, while others may be annular or portions of an annulus.

Ophthalmic Lens: as used herein refers to any ophthalmic device that resides in or on the eye. These devices can provide optical correction or may be cosmetic. For example, the term lens can refer to a contact lens, intraocular lens, overlay lens, ocular Insert, optical Insert or other similar device through which vision is corrected or modified, or through which eye physiology is cosmetically enhanced (e.g. iris color) without impeding vision. In some embodiments, the preferred lenses of the invention are soft contact lenses made from silicone elastomers or hydrogels.

Lens forming mixture or "Reactive Mixture" or "RMM" (reactive monomer mixture): as used herein refers to a monomer or prepolymer material that can be cured, crosslinked; or crosslinked to form an Ophthalmic Lens. Various embodiments can include lens-forming mixtures with one or more additives such as, but not limited to, UV blockers, tints, photoinitiators, or catalysts, and other suitable in an ophthalmic lenses, contact lenses, or intraocular lenses.

Lens Forming Surface: refers to a surface that is used to mold a lens. In some embodiments, any such surface can have an optical quality surface finish, which indicates that it is sufficiently smooth and formed so that a lens surface fashioned by the polymerization of a lens forming material in contact with the molding surface is optically acceptable. Further, in some embodiments, the lens-forming surface can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: as used herein refers to an electrochemical cell where Lithium ions move through the cell to generate electrical energy. This electrochemical cell, typically called a battery, may be reenergized, or recharged in its typical forms.

Multi-piece Insert: as used herein refers to a formable or rigid substrate capable of supporting an Energy Source within an Ophthalmic Lens. In some embodiments, the Multi-piece Insert also supports one or more components.

Mold: as used herein refers to a rigid or semi-rigid object that may be used to form lenses from uncured formulations. Some preferred molds include two mold parts forming a front curve mold part and a back curve mold part.

Optical Zone: as used herein refers to an area of an Ophthalmic Lens through which a wearer of the Ophthalmic Lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for certain, reestablished time period.

Reenergize or Recharge: as used herein refers to restore to a state with higher capacity to do work. Many uses within this invention may relate to restoring a device to the capability to flow electrical current at a certain rate for certain, reestablished time period.

Released from a mold: as used herein means that a lens is completely either separated from the mold, or is only loosely attached so that it can be removed with mild agitation or pushed off with a swab.

Stacked Integrated Component Devices: as used herein and sometimes referred to as "SIC-Devices," refers to the product of packaging technologies that can assemble thin layers of substrates, which may contain electrical and electromechanical devices, into operative integrated devices by means of stacking at least a portion of each layer upon each other. In some embodiments, the layers may comprise component devices of various types, materials, shapes, and sizes. Furthermore, the layers may be made of various device production technologies to fit and assume various contours, as it may be desired.

Proceeding to FIG. 1, an apparatus 100 to form patterned ophthalmic devices containing sealed and encapsulated Inserts is depicted. The apparatus 100 includes an exemplary front curve mold 102 and a matching back curve mold 101. In some embodiments, an insert 104 and a body of the Ophthalmic Lens device 103 may be found inside these two molds 101 and 102. In some embodiments, body of Ophthalmic Lens device 103 may be a hydrogel material and the Insert 104 may be surrounded on all surfaces by this material.

The Insert 104 may be one of many different types of Inserts. In the depiction of FIG. 1, there may be at least one patterned surface 105 in the Insert 104. There may be many different manners to pattern either the Insert 104 or the body of the Ophthalmic Lens device 103 which form the patterning surface 105. In some embodiments, the apparatus 100 may create a novel ophthalmic device made up of a combination of components with numerous sealed regions.

Referring back to FIG. 1, a diagram of an exemplary mold device 100 for an Ophthalmic Lens is illustrated with a Multi-piece Insert 104. As used herein, a mold device 100 includes a plastic formed to shape a cavity 106 into which a lens-forming mixture can be dispensed such that upon reaction or cure of the lens forming mixture, an Ophthalmic Lens of a desired shape is produced. In some embodiments, the molds and mold device 100 are made up of more than one "mold parts" or "mold pieces" 101-102. The mold parts 101-102 can be brought together such that a cavity 105 is formed between the molds parts 101-102 in which a lens can be formed. This combination of mold parts 101-102 is preferably temporary. Upon formation of the Ophthalmic Lens device, the mold parts 101-102 can again be separated for removal of the lens.

In some embodiments, at least one mold part 101-102 has a portion of its surface in contact with the lens forming mixture such that upon reaction or cure of the lens forming mixture that surface provides a desired shape and form to the portion of the lens with which it is in contact. The same is true of other mold part 101-102.

In some embodiments, a mold device 100 is formed from two parts 101-102, a female concave piece (front piece) 102 and a male convex piece (back piece) 101 with a cavity 106 in between them. The portion of the concave surface which makes contact with a lens-forming mixture has the curvature of the front curve of an Ophthalmic Lens to be produced in the mold device 100, and is sufficiently smooth and formed such that the surface of an Ophthalmic Lens, formed by polymerization of the lens forming mixture—which is in contact with the concave surface—is optically acceptable.

In some embodiments, the front mold piece 102 can also have an annular flange integral with, and surrounding a circumferential edge of the Ophthalmic Lens device. In some embodiments, a lens-forming surface can include a surface with an optical quality surface finish, which indicates that it is sufficiently smooth and formed so that a lens surface fashioned by the polymerization of a lens forming material in contact with the molding surface is optically acceptable. Further, in some embodiments, the lens forming surfaces of mold pieces 101-102 can have a geometry that is necessary to impart to the lens surface the desired optical characteristics, including without limitation, spherical, aspherical and cylinder power, wave front aberration correction, corneal topography correction and the like as well as any combinations thereof.

In some embodiments, a Multi-piece Insert 104 is illustrated onto which an Energy Source and a Component are mounted. The Multi-piece Insert 104 may be any receiving material onto which an Energy Source may be placed, and in some embodiments may also include circuit paths, components and other aspects useful to place the Energy Source in electrical communication with the Component and enable the Component to draw an electrical current from the Energy Source. In some embodiments, sealing and encapsulating 105 allow for a functional Insert to be manufactured in multiple pieces and then reliably assembled and sealed for eventual inclusion into an ophthalmic device, where materials in the ambient of the ophthalmic device and materials inside the Insert device cannot diffuse through the Insert materials or seals 105.

Various embodiments also include placing an Energy Source into a Multi-piece Insert 104 prior to placement of the Multi-piece Insert 104 into a mold portion used to form a lens. The Multi-piece Insert 104 may also include one or more components that will receive an electrical charge via the Energy Source.

In some embodiments, a lens with a Multi-piece Insert 104 can include a rigid center and a soft skirt design in which a central rigid optical element is in direct contact with the atmosphere and the corneal surface on respective an anterior and posterior surfaces. Furthermore, a soft skirt of lens material (typically made of hydrogel material) is attached to a periphery of the rigid optical element. In some embodiments, the rigid optical element also acts as a Multi-piece Insert providing energy and functionality to the resulting Ophthalmic Lens.

Some additional embodiments include a Multi-piece Insert 104 that is a rigid lens Insert fully encapsulated within a hydrogel matrix. A Multi-piece Insert 104 that is a rigid lens Insert may be manufactured, for example, by using microinjection-molding technology. Embodiments can include, for example, a poly(4-methylpent-1-ene copolymer resin with a diameter of between about 6 mm to 10 mm, a front surface radius of between about 6 mm and 10 mm, a rear surface radius of between about 6 mm and 10 mm, and a center thickness of between about 0.050 mm and 0.5 mm. Some exemplary embodiments include an Insert with diameter of about 8.9 mm, a front surface radius of about 7.9 mm, a rear surface radius of about 7, 8 mm, a center thickness of about 0.100 mm, and an edge profile of about 0.050 radius. One exemplary micromolding machine can include the Microsystem 50 five-ton system offered by Battenfield Inc. Some or all of the sealing features, including grooves, slots, lips, knife-edges and the like may be formed during the molding process or later formed by subsequent processing of the molding process.

In some embodiments, a Multi-piece Insert can be placed in mold parts 101-102 utilized to form an Ophthalmic Lens device. In some embodiments, Mold part 101-102 material can include, for example: a polyolefin of one or more of: polypropylene, polystyrene, polyethylene, polymethyl methacrylate, and modified polyolefins. Other molds can include a ceramic or metallic material.

In some embodiments, other mold materials that may be combined with one or more additives to form an Ophthalmic Lens mold include, for example, Zieglar-Natta polypropylene resins (sometimes referred to as znPP); a clarified random copolymer for clean molding as per FDA regulation 21 CFR (c) 3.2; a random copolymer (znPP) with ethylene group.

In some embodiments, mold parts 101-102 may contain polymers such as polypropylene, polyethylene, polystyrene, polymethyl methacrylate, modified polyolefins containing an alicyclic moiety in the main chain, and cyclic polyolefins. This blend can be used on either or both mold parts 101-102. In some embodiments, this blend is used on the back mold part 101, and the front mold part 102; and includes alicyclic co-polymers.

In some embodiments, injection molding is utilized according to known techniques, however, embodiments can also include molds fashioned by other techniques including, for example: lathing, diamond turning, or laser cutting.

In some other embodiments, Ophthalmic Lens devices are formed on at least one surface of both mold parts 101-102. However, in some embodiments, one surface of a lens may be formed from a mold part 101-102 and another surface of a lens can be formed using a lathing method, or any other methods.

Figure 2:
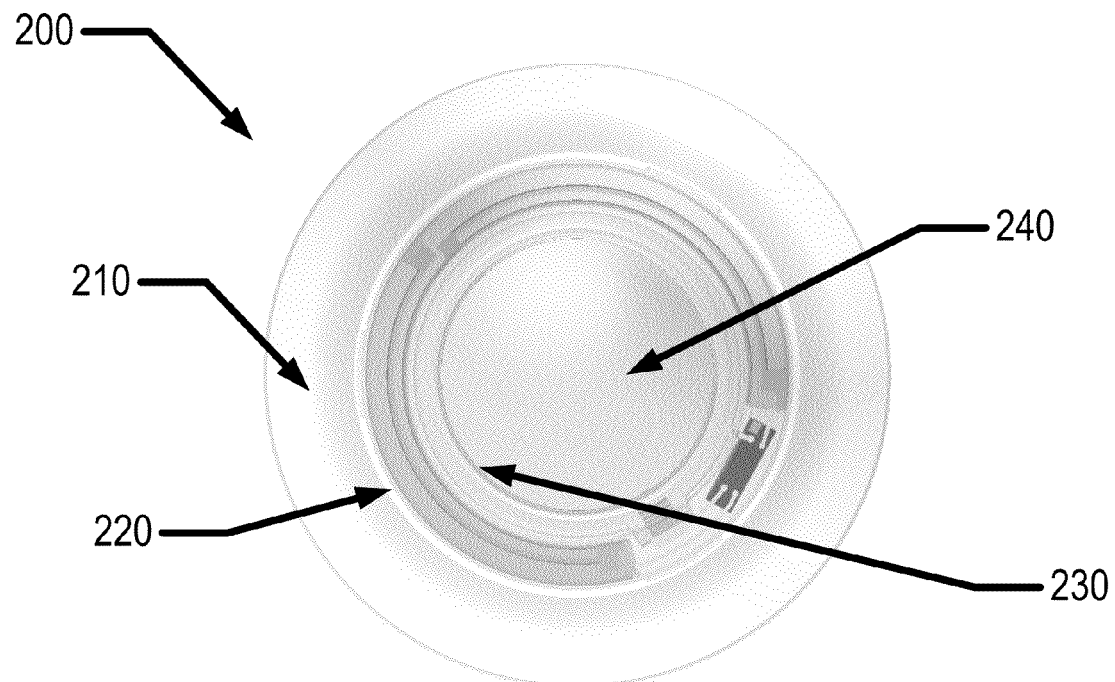
FIG. 2 illustrates an energized ophthalmic lens with a sealed insert embodiment.

Proceeding to FIG. 2, an example of an unpatterned Ophthalmic Lens device 200 with embedded Insert is depicted in cross section. In some embodiments, a surrounding ophthalmic device shell 210 may be formed by the molding features of FIG. 1, and may be made of numerous materials including hydrogel compounds.

Additionally, the Ophthalmic Lens device 200 may include an Insert 220. In some embodiments, the Insert 220 may be made of multiple pieces and have various kinds of seals utilized to complete the Insert 220.

In some embodiments, the Ophthalmic Lens device 200 may also include a component device layer 230 that may include, but not limited to, activation elements, processing elements, energization elements, and sensing elements. In some embodiments, there may be numerous encapsulation schemes that are relevant to the inclusion of such a layer. In addition, in some embodiments, the layers 210 may be adhered to other components 240 such as an active optical device before the resulting Insert is fixed into an ophthalmic device, as is shown in FIG. 1.

Referring back to FIG. 2, an unpatterned version of a formed ophthalmic device and incorporation of various components is illustrated.

Figure 3:
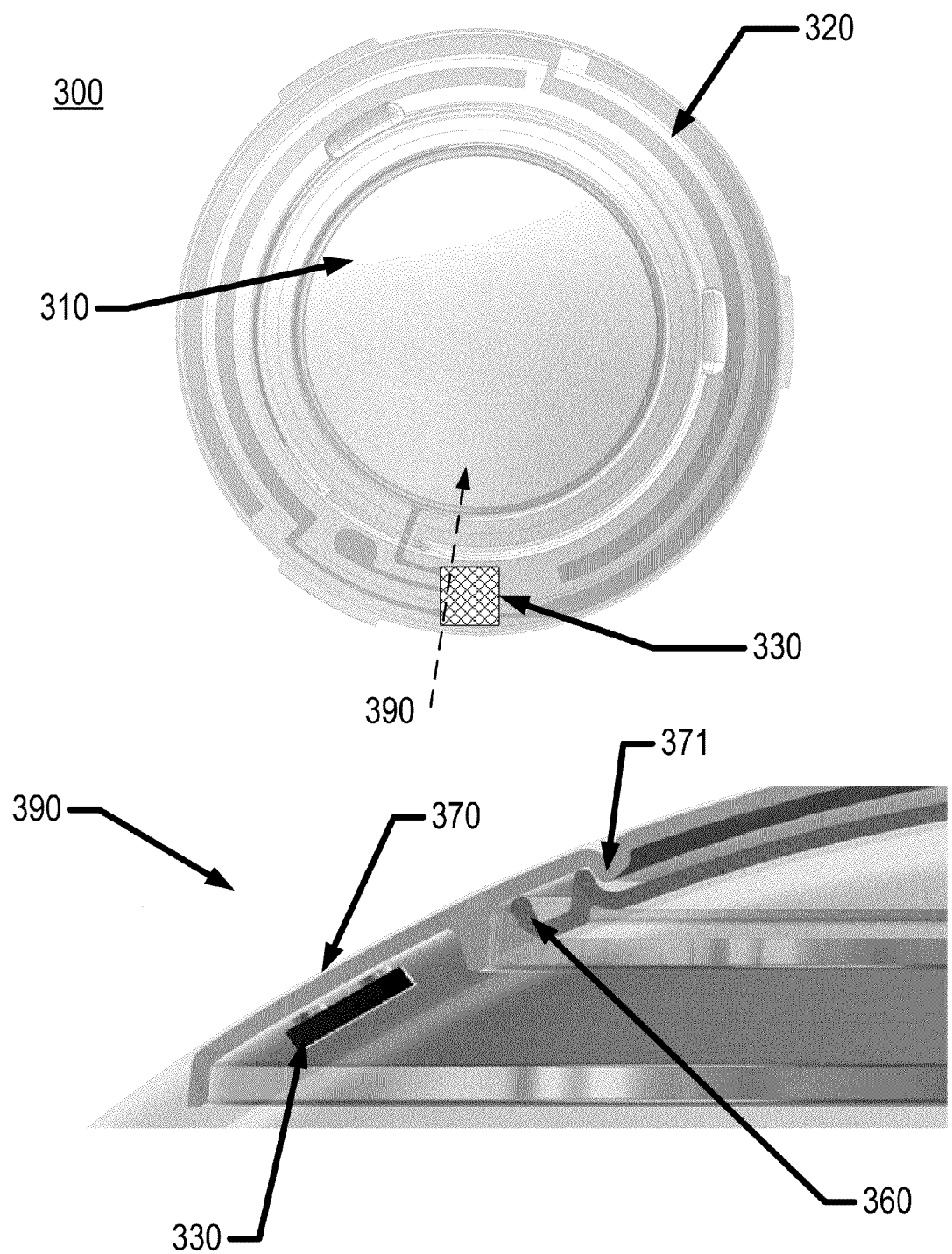
FIG. 3 illustrates an energized ophthalmic lens with a sealed annular shaped insert embodiment.

Proceeding to FIG. 3, a close up cross section 300 of the edge of an exemplary ophthalmic device is shown. In some embodiments, a top view 390 of the cross section 300 is illustrated. In some embodiments, the ophthalmic device may be considered full, because in optic zone 310 there may be an Insert or other active components of various kinds. For example, in a meniscus type lens, the region optic zone 310 may be surrounded by two immiscible fluids that form the basis of a meniscus type active lens. In some embodiments, optic zone 310 may represent the front surface of the Insert, and may be a molded separate piece onto which various conductive electrode metal layers may have been deposited. In some embodiments, various electrical components 330 and electrical traces with energization elements 320 are present.

In some embodiments, the molded front piece 310 may have a recess 371 molded into it, which will then intersect with the molded, but separate, back piece 360 as shown. In some embodiments, recess 371 may be called a glue groove. In some other embodiments, when front piece and back piece are brought into proximity of each other—whether before or after the fluids are filled into a cavity that is formed by the two pieces—the back piece may be advanced to firmly register into the groove 371. Thereafter, an adhesive or sealant may be deposited into the remaining space of the groove 371. In some embodiments, groove 371 may be located around the entire periphery of the Ophthalmic Lens device itself. In some embodiments, surface 370 may presents an exemplary location where patterns may be placed to create a patterned Insert formed by patterning of the Insert itself. In some other embodiments, other surfaces may be patterned and formed. In addition, in some embodiments encapsulants 331 may define surfaces that may be patterned. In many embodiments, nevertheless, the front facing surface 370 may still be patterned along with any patterning on back curve surfaces 360 or surfaces located on the back curve side.

Figure 4:
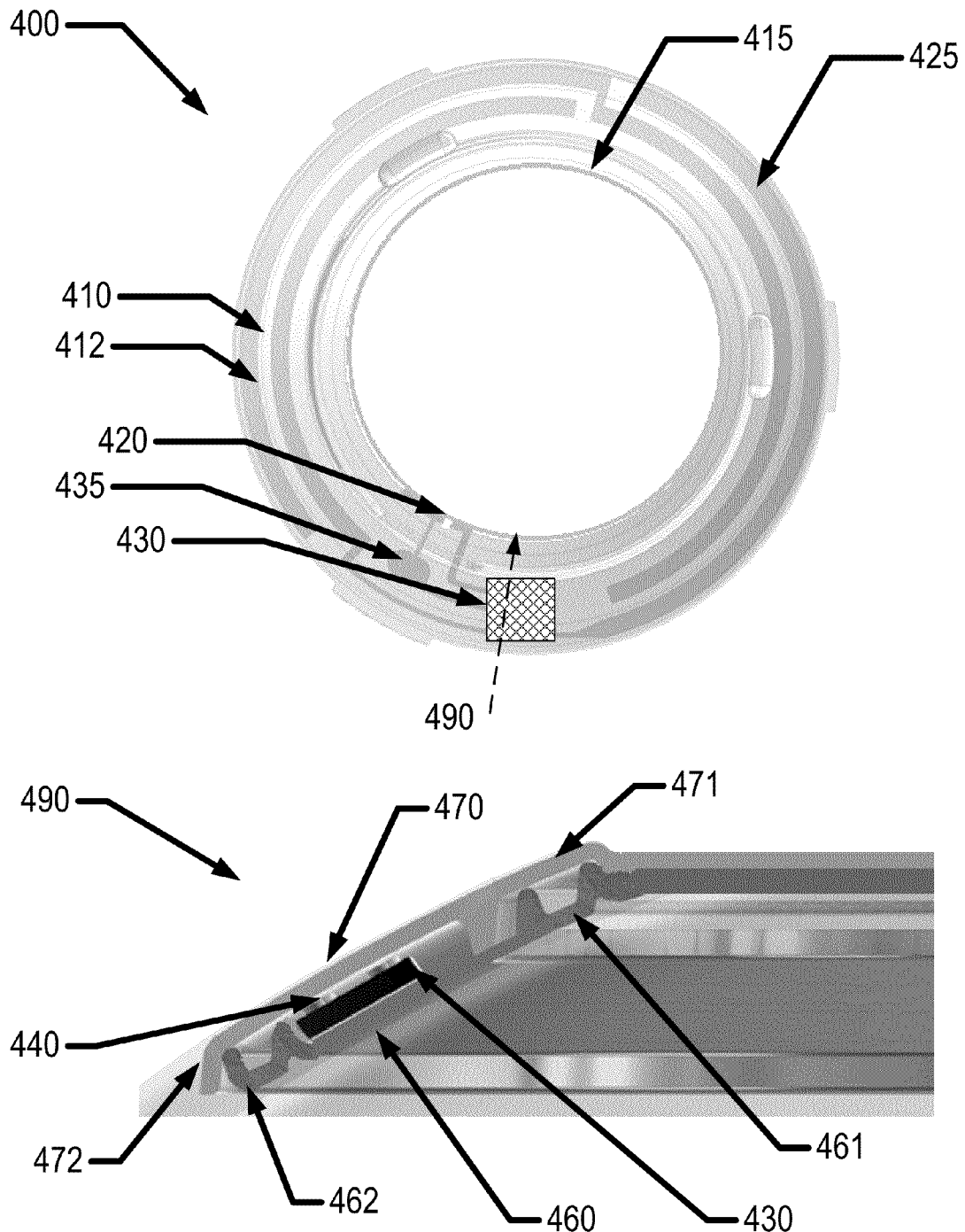
FIG. 4 illustrates the appearance of a non-patterned ophthalmic lens insert from a frontal perspective.

In some other embodiments, an Insert is not a full device as mentioned above, but rather is an annular device where at least a portion of the central portion may be devoid of material. Proceeding to FIG. 4, an illustration of such an annular Insert type 400 may be found. The annular Insert 400 may have a front curve piece 410 that may have a front facing surface 470. In some embodiments, an inner edge 415 defines the inner feature of the annular Insert 400.

In some embodiments, a cross sectional 490 of the annular Insert 400 is disclosed. In the cross section 490, the front curve piece with surface 470 may extend from molded edges 471 and 472 on the two extremes of the annulus. In some embodiments, there may be a back curve piece 460 that covers and encapsulates a region between the front and back curve pieces. The back curve piece 460 may have an extent that ranges from molded features at 461 and 462. In some other embodiments, back cure piece 460 may provide additional surfaces upon which patterning features may be formed.

In some embodiments, annular Insert 400 may contain numerous components. In a non-limiting exemplary sense, the Insert 400 may contain electronic devices 430. In some embodiments, electronic devices 430 may be electrically connected by connection features such as solder balls 440, and sensing elements 420. In some embodiments, electrical traces may be present within the cavity defined by pieces 470 and 460 as well as energization elements. As with the full device of item 300, the presence of these numerous components and devices may give an annular device an appearance that would be similar to that shown in FIG. 2 if there were no patterning performed on at least some of the various surfaces.

In some embodiments, a Multi-Piece Insert 400 may have an Optic Zone 415 that includes a variable optic, 412, powered by an Energy Source 430 located on the Multi-Piece Insert 400. The Multi-Piece Insert 400 can also include circuitry 425 to control the variable optic 412 included in the optic zone 415. In some embodiments, a variable optic 412 can be considered a Component.

In some embodiments, an Energy Source 430 can be in electrical communication with a Component 435. The Component 435 can include any device, which responds to an electrical charge with a change in state, such as, for example: a semiconductor type chip; a passive electrical device; or an optical device such as a crystal lens.

In some specific embodiments, an Energy Source includes, for example: battery or other electrochemical cell; capacitor; ultracapacitor; supercapacitor; or other storage Component. Some specific embodiments can include a battery located on a Multi-Piece Insert 400 on the periphery of an Ophthalmic Lens outside of the optic zone 415.

Figure 5:
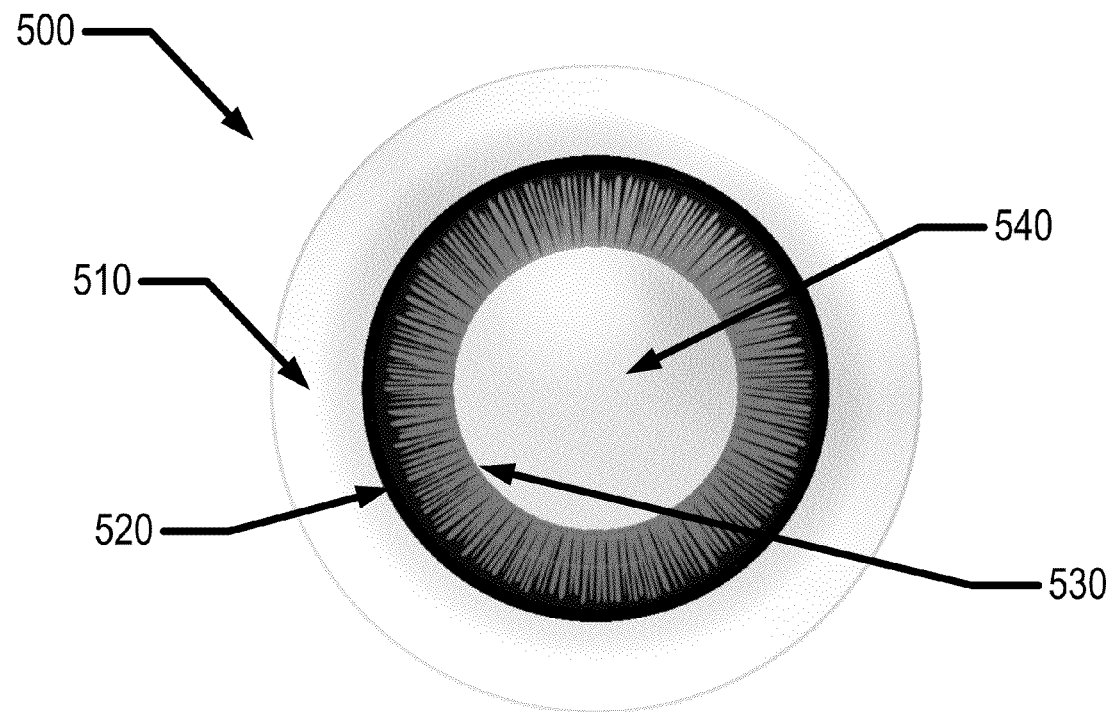
FIG. 5 illustrates the appearance of a patterned ophthalmic lens where the patterning resembles a limbal ring pattern from both a frontal and cross section perspective.
Figure 5:
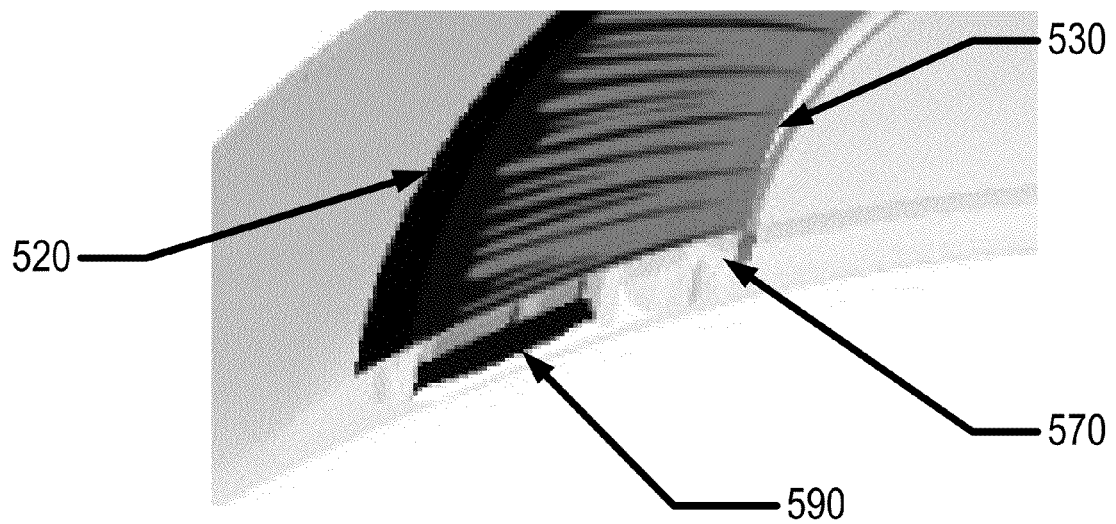

Proceeding to FIG. 5, appearance of an exemplary patterned Ophthalmic Lens device 500 may be observed. The type of pattern displayed in the Ophthalmic Lens device 500 may be considered a Limbal ring pattern. In some embodiments, a hydrogel 510 may represent an encapsulating layer for an Insert 512. In some embodiments, the printed pattern may completely cover the Insert 512 from the dense limbic ring 520 to the other side 530. In some embodiments, internal regions 540 of the Ophthalmic Lens device 500 may locate an active optical device in the optic zone. In some other embodiments, the internal region 540 may be made of hydrogel material alone if the Insert 512 is of annular shape.

Referring back to FIG. 5, in the cross section below, the nature of the pattern and its ability to cover the material underneath it may be illustrated. Once again, the pattern represents a Limbal Ring pattern and is printed from region 520 to region 530. Numerous components and features may be located under the pattern including, but not limiting to, integrated circuits 590, and electrical interconnects 570.

In some embodiments, the pattern may be attached surface of one or more items included in an insert device, such as for example, on a surface of a front curve piece, piece of an Insert device, or a back curve piece of an Insert device. In other embodiments, the pattern may be placed onto the body of the Ophthalmic Lens device. In other embodiments, the pattern may be placed beneath the surface of the Ophthalmic Lens device by an injection process, or alternatively by a multilayered process of forming the body of the Ophthalmic Lens device.

In some embodiments, a coating may be applied to the pattern and the Insert to promote consistent adhesion properties between the Insert device with pattern and a hydrogel portion of an Ophthalmic Lens. In some embodiments, the coating may, for example, include paralene.

Figure 6:
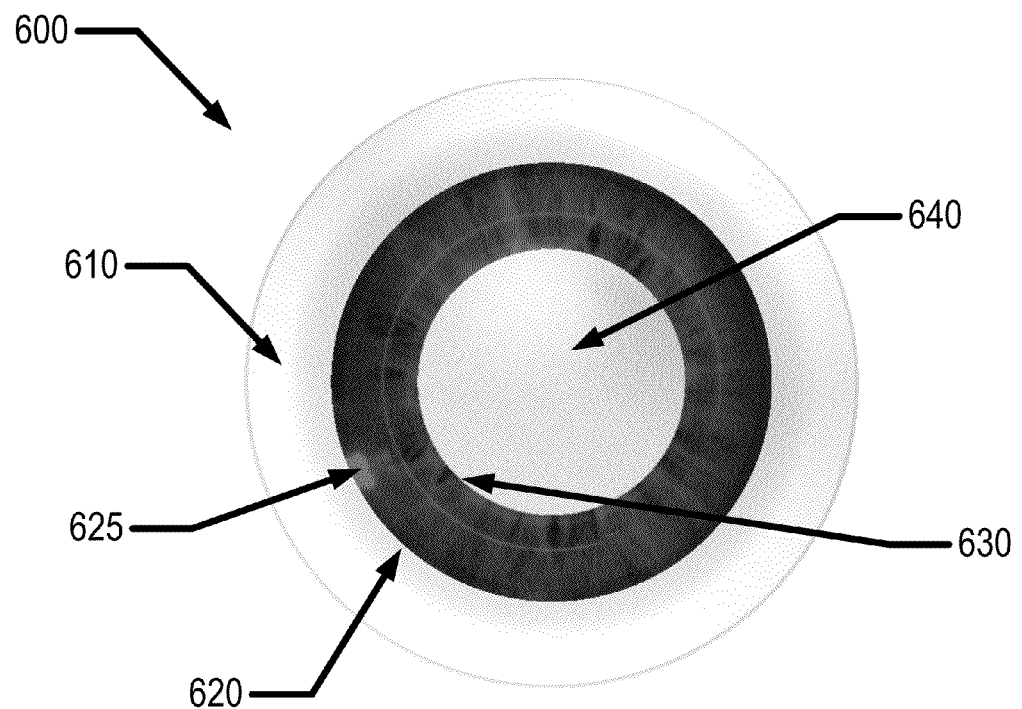
FIG. 6 illustrates the appearance of a patterned ophthalmic lens where the patterning resembles an iris pattern from both a frontal and cross section perspective.
Figure 6:
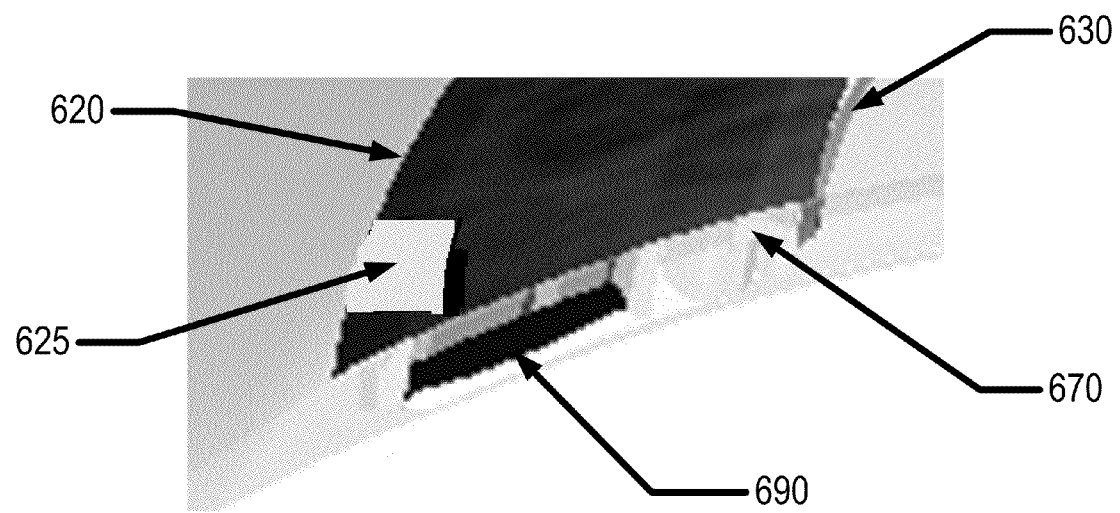

Proceeding to FIG. 6, a different type for a patterned Ophthalmic Lens device 600 is depicted. In some embodiments, the pattern that is printed may represent an iris type pattern. In some embodiments, the color of the pattern may assume a wide variety of choices ranging from natural pigmentation types of color to other colors. The patterned lens may have similar defined regions such as, a central optic zone 640, or a patterned region from an interior ring 630 to an exterior ring 620. In some embodiments, an Insert may be encapsulated by Ophthalmic Lens materials such as hydrogel. In some other embodiments, skirt 610 that surrounds the Insert and defines the external shape of the Ophthalmic Lens device 600 is present.

Referring back to FIG. 6, in a cross section, the patterned region between item 620 and 630 is demonstrated. As discussed in FIG. 5, the patterned region may cover or obscure underlying components. In some embodiments, the patterned region may further include features such as integrated circuits 690, and electrical interconnects 670. In some other embodiments, numerous other features and components may lie under the patterned region within the Ophthalmic Lens device 600.

In some embodiments, a region of transparent patterning, or non-patterning 625 is located within the pattern design. As a non-limiting example, an integrated circuit 690 is depicted. In an exemplary embodiment, the integrated circuit 690 may include functional elements to allow it to detect changes in ambient light in the integrated circuit's environment, which may occur when a user blinks. There may be numerous reasons that detecting such a blink may be useful, including, for example, the use of blinking to control or signal the desire to change a state in the Ophthalmic Lens. In such an embodiment, it may be desirable for any patterns on the lens to have a window 625 that allows light to pass through the patterned region and into an underlying detector 690. The window 625 may be made by the lack of pattern-forming material, or by an alternative material, which is transparent to light of certain wavelengths that the detector may detect. In some embodiments, the presence of light on the integrated circuit 690, except in regions meant for detection, may have adverse effects on the performance of the Ophthalmic Lens device 600. Therefore, in addition to aesthetic purposes of patterning the lens, functional motivations such as the exclusion of light from circuit elements, extending the life of energization elements, may also be relevant.

In some other embodiments, various types of patterning that would conceal components and features from visual recognition are disclosed. In some embodiments, a vast array of possible pattern designs is consistent with the inventive art that has been designed. As a non-limiting example, a design approach based on principles of camouflage may be employed where instead of blocking the appearance of underlying features the printed pattern renders them less recognizable. There may be many patterns that may be employed when patterning ophthalmic devices with Inserts.

In some embodiments, an ophthalmic lens can include a lens that includes a silicone-containing component. A "silicone-containing component" is one that contains at least one [—Si—O—] unit in a monomer, macromer, or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as, but not limiting to, acrylate, methacrylate, acrylamide, methacrylamide, vinyl, N-vinyl lactam, N-vinylamide, and styryl functional groups.

In some embodiments, the ophthalmic lens skirt or an insert encapsulating layer surrounding the Insert may be comprised of standard hydrogel lens formulations. Exemplary materials with characteristics that may provide an acceptable match to numerous Insert materials may include the Narafilcon family; including Narafilcon A and Narafilcon B. Alternatively, exemplary materials with characteristics that may provide an acceptable match to numerous Insert materials may include the Etafilcon family; including Etafilcon A may represent good exemplary material choices. In some embodiments, any materials that may form an acceptable enclosure or partial enclosure of the sealed and encapsulated Inserts may be included.

In some embodiments, suitable silicone containing components include compounds of Formula I

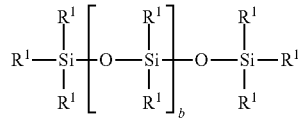

where:

$R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and three $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates, and O-vinylcarbonates. Non-limiting examples of cationic reactive groups include vinyl ethers, epoxide groups, and mixtures thereof. In some embodiments, the free radical reactive groups comprises (meth)acrylate, acryloxy, (meth)acrylamide, and mixtures thereof.

In some embodiments, suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof, and the like.

In some embodiments, b is zero, one $R^1$ is a monovalent reactive group, and at least three $R^1$ are selected from monovalent alkyl groups having one to sixteen carbon atoms. In some other embodiments, $R^1$ are selected from monovalent alkyl groups having one to six carbon atoms. Non-limiting examples of silicone components of this embodiment include 2-methyl-, 2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy) silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In some other embodiments, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms. In some other embodiments, $R^1$ are selected from monovalent alkyl groups having one to six carbon atoms. In yet other embodiments, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethyl-siloxane (400-1000 MW)) ("OH-mPDMS"), monomethacryloxypropyl terminated mono-n-butyl terminated polydimethylsiloxanes (800-1000 MW), ("mPDMS").

In other embodiments, b is 5 to 400 or from 10 to 300, both terminals $R^1$ comprise monovalent reactive groups and the remaining $R^1$ are independently selected from monovalent alkyl groups having 1 to 18 carbon atoms that may have ether linkages between carbon atoms, and may further comprise halogen.

In other embodiments, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In other embodiments, one to four $R^1$ comprises a vinyl carbonate or carbamate of the formula:

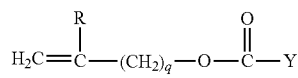

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

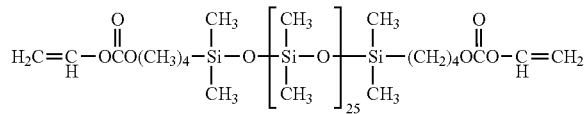

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

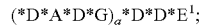

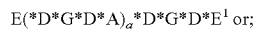

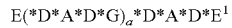          Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1;
A denotes a divalent polymeric radical of formula:

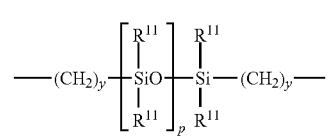

Formula VII $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by formula:

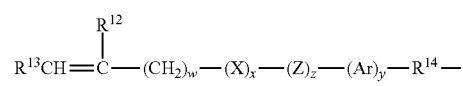

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX (the full structure may be understood by joining corresponding asterisk regions, * to *,  to )

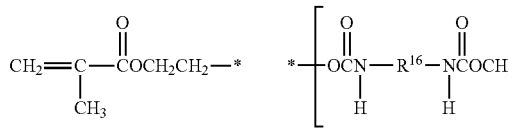

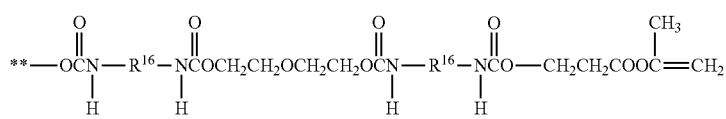

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X (the full structure may be understood by joining corresponding asterisk regions, * to *)

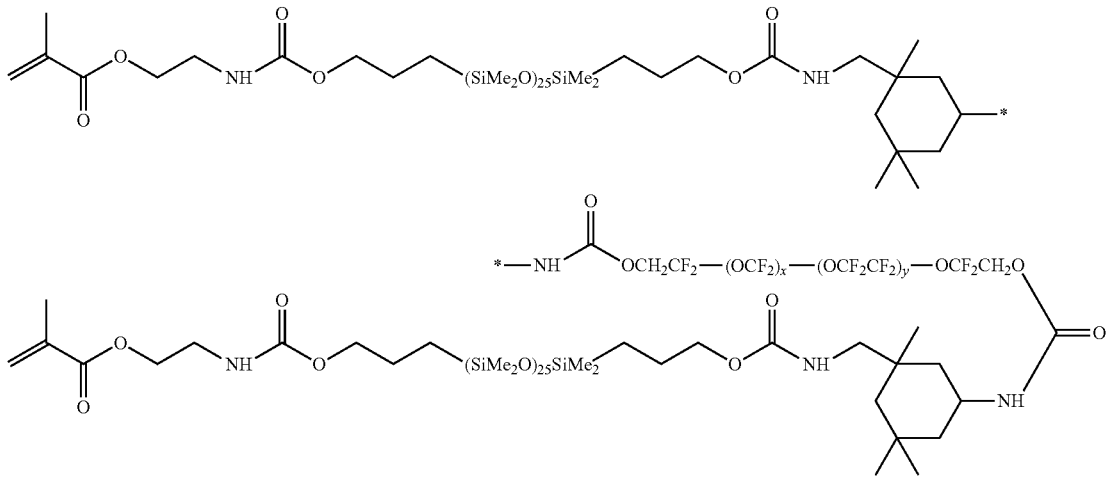

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

CONCLUSION

The present invention, as described above and as further defined by the claims below, provides methods for patterning Multi-piece Inserts and or Ophthalmic lens formed with embedded Inserts. The present invention also includes apparatus for implementing such methods, as well as ophthalmic lenses formed with the Multi-piece Inserts, which have been patterned.

The invention claimed is:

1. A multi-piece insert device for an ophthalmic lens comprising:
   a first back curve piece;
   a first front curve piece proximate to the first back curve piece such that the first front curve piece registers with the first back curve piece and forms a cavity between the first back curve piece and the first front curve piece;
   at least a second back curve piece in contact with the first back curve piece;
   a pattern of conductive material within the cavity placed upon one or both of the first front curve piece and the first back curve piece;
   at least one electronic component attached to at least a part of the pattern of conductive material; and
   a first colorant pattern on a surface of one or both of the first front curve piece and the first back curve piece.

2. The multi-piece insert device of claim 1, wherein the first colorant pattern is a limbal ring pattern.

3. The multi-piece insert device of claim 2, wherein the limbal ring pattern comprises a black colorant.

4. The multi-piece insert device of claim 1, wherein the first colorant pattern is an iris pattern.

5. The multi-piece insert device of claim 1, wherein the first colorant pattern is a camouflage pattern that obstructs the observance of the electrical component within the multi-piece insert device by changing the appearance of the electrical component.

6. The multi-piece insert device of claim 1, additionally comprising a first region located within the first colorant pattern that allows visible light to pass through.

7. The multi-piece insert device of claim 6, additionally comprising a light detector located between the first front curve piece and the first back curve piece and behind the first region.

8. The multi-piece insert device of claim 6, additionally comprising a second region located within the first colorant pattern comprising a colorant that is opaque to visible light.

9. The multi-piece insert device of claim 8, additionally comprising an integrated circuit device located between the first front curve piece and the first back curve piece such that at least a portion of the integrated circuit device is behind the second region.

10. The multi-piece insert device of claim 6, wherein the first region only allows light having certain wavelengths to pass through.

11. An ophthalmic lens device comprising:
   a multi-piece insert having at least a first back curve piece, a second back curve piece and a first front curve piece proximate to the first back curve piece such that the first front curve piece registers with the first back curve piece and forms a cavity between the first back curve piece and the first front curve piece;
   a conductive material within the cavity placed upon one or both of the first front curve piece and first back curve piece;
   at least one electronic component attached to at least part of the conductive material;

an encapsulating layer surrounding the multi-piece insert, wherein the encapsulating layer comprises a hydrogel; and a first colorant pattern on a surface of the encapsulating layer.

12. The ophthalmic lens device of claim 11 wherein the first colorant pattern is a limbal ring pattern.

13. The ophthalmic lens device of claim 11, wherein the first colorant pattern is an iris pattern.

14. The ophthalmic lens device of claim 11, wherein the first colorant pattern is a camouflage pattern that obstructs the observance of the electrical component within the multi-piece insert by changing an appearance of the electrical component.

15. The ophthalmic lens device of claim 11, additionally comprising a first region located within the first colorant pattern allowing visible light to pass through.

16. The ophthalmic lens device of claim 15, additionally comprising a light detector located between the first front curve piece and the first back curve piece and behind the first region.

17. The ophthalmic lens device of claim 15, wherein the first region only allows light having certain wavelengths to pass through.

18. The ophthalmic lens device of claim 16, additionally comprising a second region located within the first colorant pattern comprising a colorant that is opaque to visible light.

19. The ophthalmic lens device of claim 18, additionally comprising an integrated circuit device located between the first front curve piece and the first back curve piece such that at least a portion of the integrated circuit device is behind the second region.

20. The ophthalmic lens device of claim 11, additionally comprising a liquid meniscus lens element.

21. The ophthalmic lens device of claim 11, additionally comprising a coating over the insert and the first colorant pattern, wherein the coating comprises a more consistent adhesion property than the multi-piece insert and the first colorant pattern without the coating.

22. The ophthalmic lens device of claim 21, wherein the coating comprises a paralene.

23. The ophthalmic lens device of claim 21, wherein the coating is applied between the multi-piece insert and the encapsulating layer.

* * * * *